United States Patent
Chang et al.

(10) Patent No.: US 8,072,151 B2
(45) Date of Patent: Dec. 6, 2011

(54) INVERTER CIRCUIT

(75) Inventors: Chih-Chang Chang, Hsinchu (TW); Chao-Tung Fan-Chiang, Hsinchu (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 716 days.

(21) Appl. No.: 12/189,128

(22) Filed: Aug. 8, 2008

(65) Prior Publication Data
US 2009/0046488 A1 Feb. 19, 2009

(30) Foreign Application Priority Data
Aug. 17, 2007 (CN) .................. 2007 2 0122156 U

(51) Int. Cl.
*H05B 37/001* (2006.01)
(52) U.S. Cl. ....................................... 315/177; 315/312
(58) Field of Classification Search .................. 315/177, 315/200 R, 201, 206, 205, 250, 246, 254, 315/255, 272, 274, 276, 277, 291, 297, 299, 315/300, 307, 308, 312
See application file for complete search history.

(56) References Cited

U.S. PATENT DOCUMENTS
7,315,136 B1 * 1/2008 Chen et al. .................. 315/282
* cited by examiner

*Primary Examiner* — Douglas W Owens
*Assistant Examiner* — Jianzi Chen
(74) *Attorney, Agent, or Firm* — Altis Law Group, Inc.

(57) ABSTRACT

An inverter circuit (20) includes a transformer (T2) including a primary winding and a secondary winding including a high voltage terminal, a first copper foil (P21), a power stage circuit (21) electrically connected to the primary winding, a detection circuit (22) including a second copper foil (P22) and an impedance (Z2), a protection circuit (23) outputting a protection signal, and a pulse width modulation controller (24) controlling output of the power stage circuit according to the protection signal. The second copper foil and the first copper foil are separated. An equivalent capacitor is formed between the second copper foil and the first copper foil, detecting voltage output from the high voltage terminal. The impedance is electrically connected between the second copper foil and ground, dividing a voltage detected by the equivalent capacitor.

7 Claims, 4 Drawing Sheets

INVERTER CIRCUIT

BACKGROUND

1. Field of the Invention

The invention relates to inverter circuits, and particularly to an inverter circuit with protection function.

2. Description of Related Art

Conventionally, discharge lamps, especially cold cathode fluorescent lamps (CCFL), have been used as backlight sources in liquid crystal display (LCD) panels, driven by an inverter circuit supplying alternating current signals. Often, the inverter circuit includes a power stage circuit and a protection circuit to protect normal operation thereof.

FIG. 4 shows a conventional inverter circuit. The inverter circuit, driving a light source L1, includes a power stage circuit 10, a protection circuit 12, a pulse width modulation (PWM) controller 13, a transformer T1, a first capacitor $C_{11}$, and a second capacitor $C_{12}$. The power stage circuit 10 converts a received signal to an alternating current (AC) signal. The first capacitor $C_{11}$ and the second capacitor $C_{12}$ are arranged in series and connected between a high voltage terminal of a secondary winding of the transformer T1 and ground, the first capacitor $C_{11}$ and the second capacitor $C_{12}$, dividing a voltage output from the high voltage terminal of a secondary winding of the transformer T1, resulting in a divided voltage. The protection circuit 12 is connected to a node formed between the first capacitor $C_{11}$ and the second capacitor $C_{12}$, comparing the divided voltage to a reference voltage and outputting a protection signal. The PWM controller 13 is connected between the protection circuit 12 and the power stage circuit 10, controlling output thereof according to the protection signal.

In a conventional inverter circuit, either the first capacitor $C_{11}$ or the second capacitor $C_{12}$ is a high voltage capacitor, and the other is a low voltage capacitor. However, the high voltage capacitor is very costly, increasing the overall cost of the inverter circuit. The inverter circuit is disposed on a multilayer circuit, and the high voltage capacitor is formed between copper layers of the multi layer circuit. Because the multi layer circuit is expensive, the overall cost of the inverter circuit is increased correspondingly.

Therefore, a heretofore unaddressed need exists in the industry to overcome the described limitations.

SUMMARY

An exemplary embodiment of the invention provides an inverter circuit disposed on a single layer circuit for driving a light source. The inverter circuit includes a transformer including a primary winding and a secondary winding including a high voltage terminal, a first copper foil electrically connected between the light source and the high voltage terminal, a power stage circuit electrically connected to the primary winding for converting a received signal to an alternating current (AC) signal, a detection circuit including a second copper foil and an impedance, a protection circuit electrically connected to a node formed between the impedance and the second copper foil, and a pulse width modulation (PWM) controller electrically connected between the protection circuit and the power stage circuit. The second copper foil is adjacent to the first copper foil. An equivalent capacitor is formed between the second copper foil and the first copper foil, detecting voltage output from the high voltage terminal. The impedance is electrically connected between the second copper foil and ground, dividing voltage detected by the equivalent capacitor. The protection circuit compares the voltage divided by the impedance to a reference voltage and outputs a protection signal. The PWM controller controls output of the power stage circuit according to the protection signal.

Other advantages and novel features will become more apparent from the following detailed description of preferred embodiments when taken in conjunction with the accompanying drawings, in which:

DETAILED DESCRIPTION OF THE EMBODIMENTS

Figure 1:
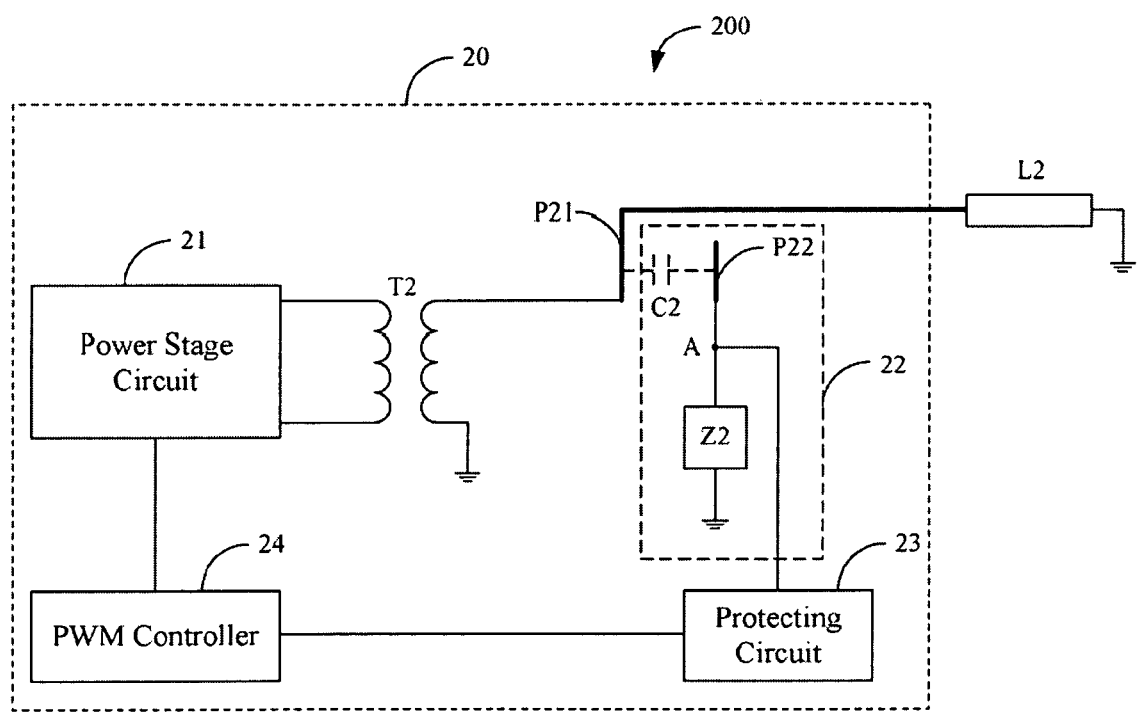
FIG. 1 is a block diagram of a backlight module of a first exemplary embodiment of the present invention.

FIG. 1 is a block diagram of a backlight module 200 of a first exemplary embodiment of the present invention. The backlight module 200 includes an inverter circuit 20 and a light source L2. The inverter circuit 20 is disposed on a single layer circuit, driving the light source L2.

The inverter circuit 20 includes a power stage circuit 21, a transformer T2, a detection circuit 22, a protection circuit 23, a first copper foil P21 and a pulse width modulation (PWM) controller 24.

The power stage circuit 21 receives a signal and converts the received signal to an alternating current (AC) signal. The power stage circuit 21 transmits the AC signal to the transformer T2. The transformer T2 includes a primary winding and a secondary winding, converting the AC signal to a signal driving the light source L2.

In the embodiment, the primary winding of the transformer T2 is electrically connected to the power stage circuit 21. A high voltage terminal of the secondary winding of the transformer T2 is electrically connected to the light source L2 via the first copper foil P21. A low voltage terminal of the secondary winding of the transformer T2 is electrically connected to ground. In other embodiments, the low voltage terminal of the secondary winding of the transformer T2 can be electrically connected to ground via an impedance.

The detection circuit 22 detects voltage output from the high voltage terminal of the secondary winding of the transformer T2, and includes a second copper foil P22 and an impedance Z2. The second copper foil P22 is adjacent to the first copper foil P21, and spaced apart therefrom, to avoid arcing therebetween. An equivalent capacitor C2 is formed between the second copper foil P22 and the first copper foil P21, detecting voltage output from the high voltage terminal of the secondary winding of the transformer T2.

The impedance Z2 is electrically connected between the second copper foil P22 and ground, that is, electrically connected between the equivalent capacitor C2 and ground. The impedance Z2 divides a voltage detected by the equivalent capacitor C2. Herein, a voltage, after being divided, is designated as a divided voltage.

A node A is formed between the impedance Z2 and the second copper foil P22. The protection circuit 23 is electrically connected to the node A, comparing the divided voltage with a reference voltage and outputting a protection signal to the PWM controller 24.

The PWM controller 24 is electrically connected between the protection circuit 23 and the power stage circuit 21, controlling output of the power stage circuit 21 according to the protection signal. In the embodiment, if the protection circuit 23 is an over-voltage protection circuit, when voltage on the light source L2 exceeds the over-voltage, the PWM controller 24 limits the highest voltage input to the light source L2 according to the protection signal to protect the light source L2.

Figure 2:
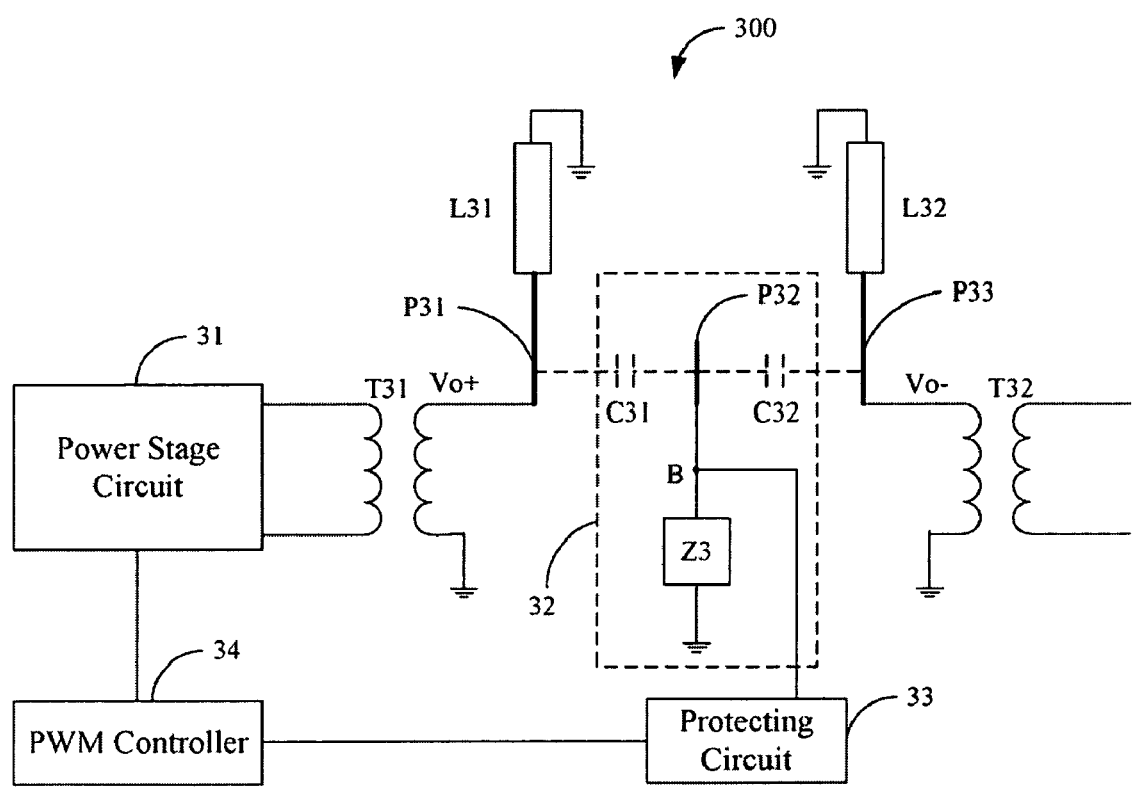
FIG. 2 is a block diagram of a backlight module of a second exemplary embodiment of the present invention.

FIG. 2 is a block diagram of a backlight module 300 of a second exemplary embodiment of the present invention. The backlight module 300 includes an inverter circuit and a pair of light sources L31 and L32. The inverter circuit is disposed on a single layer circuit, driving the light sources L31 and L32.

The inverter circuit of the backlight module 300 includes a power stage circuit 31, a pair of transformers T31 and T32, a detection circuit 32, a protection circuit 33, a pair of first copper foils P31 and P33, and a pulse width modulation (PWM) controller 34. The detection circuit 32 includes a second copper foil P32 and an impedance Z3.

In the embodiment, a high voltage terminal of the secondary winding of the transformer T31 is electrically connected to the light source L31 via the first copper foil P31, and a high voltage terminal of the secondary winding of the transformer T32 is electrically connected to the light source L32 via the first copper foil P33. Low voltage terminals of the secondary windings of the transformers T31 and T32 are electrically connected to ground. The second copper foil P32 is positioned between the first copper foils P31 and P33, and a distance between the second copper foil P32 and the first copper foil P31 is equal to that between the second copper foil P32 and the first copper foil P33. Thereby, an equivalent capacitor C31 is formed between the second copper foil P32 and the first copper foil P31, and an equivalent capacitor C32 is formed between the second copper foil P32 and the first copper foil P33. The equivalent capacitors C31 and C32 respectively detect voltages output from the high voltage terminals of the secondary windings of the transformers T31 and T32. The second copper foil P32 and the first copper foil P31 or P33 are separated from each other.

The impedance Z3 is electrically connected between the second copper foil P32 and ground. The impedance Z3 divides voltages detected by the equivalent capacitors C31 and C32. A divided voltage detected by the equivalent capacitor C31 is defined as a first divided voltage, and a divided voltage detected by the equivalent capacitor C32 is defined as a second divided voltage.

A node B is formed between the impedance Z3 and the second copper foil P32. The protection circuit 33 is electrically connected to the node B, comparing the divided voltage to a reference voltage and outputting a protection signal to the PWM controller 31.

All structures and functions of the PWM controller 31, the protection circuit 33, and the power stage circuit 34 of FIG. 2 are the same as the PWM controller 21, the protection circuit 23 and the power stage circuit 24 of FIG. 1, respectively.

In the embodiment, voltage output from the high voltage terminals of the secondary windings of the transformers T31 is defined as Vo+, and voltage output from the high voltage terminals of the secondary windings of the transformers T32 is defined as Vo−. A voltage value of the Vo+ is equal to that of the Vo−, and a phase of the Vo+ is opposite to that of the Vo−. Thus, when the light sources L31 and L32 are normal, a value of the voltage received by the protection circuit 33 is equal to 0; when the light source L31 or L32 is abnormal, the value of the voltage received by the protection circuit 33 is not equal to 0. Therefore, the protection circuit 33 determines if the light sources L31 and L32 are abnormal according to the received voltage, thereby determining if all the circuits of the backlight module 300 are closed.

In the embodiment, only if the distance between the second copper foil P32 and the first copper foil P31 is equal to that between the second copper foil P32 and the first copper foil P33, and a value of the equivalent capacitors C31 is equal to that of the equivalent capacitors C32, only then are values of the first and second divided voltages through the impedance Z3 equal. That is, the detection circuit 32 detects voltages having opposite polarities, loaded on the adjacent light sources L31 and L32.

In the embodiment, one detection circuit 32 is relative to a group of transformers T31 and T32. If the backlight module 300 includes a plurality of groups of transformers, the backlight module 300 also includes a plurality of detection circuits, and a common protection circuit protects all the circuits of the backlight module 300.

Figure 3:
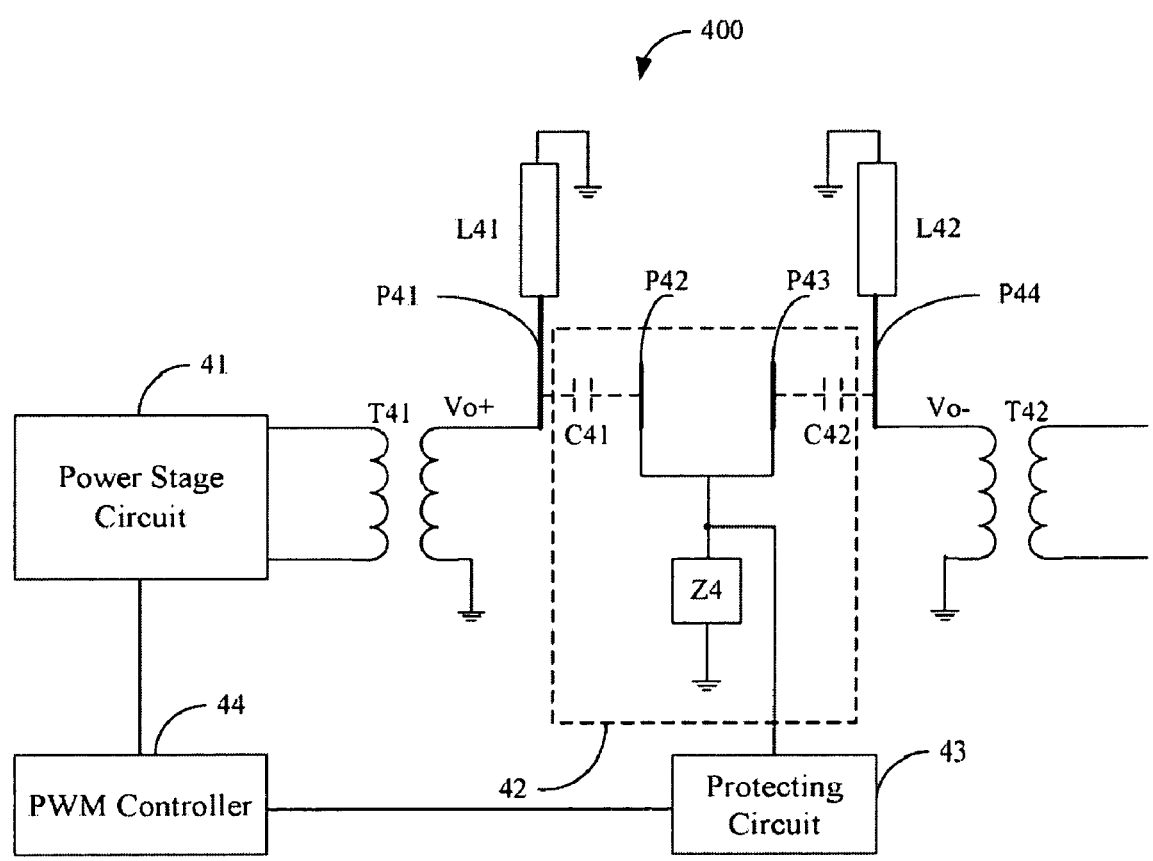
FIG. 3 is a block diagram of a backlight module of a third exemplary embodiment of the present invention.
Figure 4:
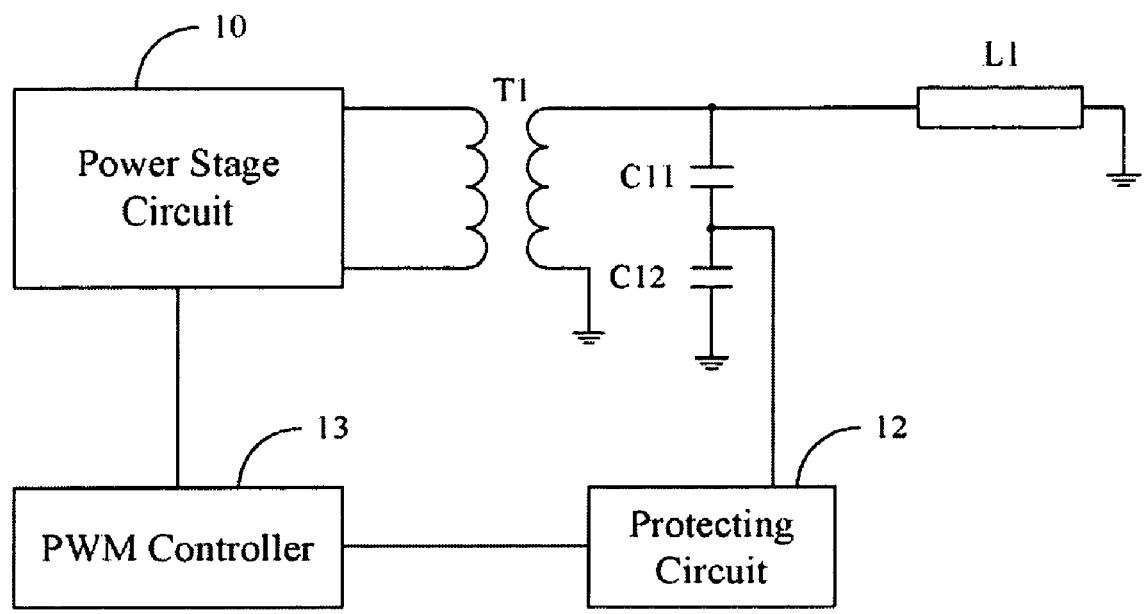
FIG. 4 is a block diagram of a conventional inverter circuit.

FIG. 3 is a block diagram of a backlight module 400 of a third exemplary embodiment of the present invention. The backlight module 400 includes an inverter circuit and a pair of light sources L41 and L42. The inverter circuit is disposed on a single layer circuit, driving the light source L41 and L42.

The inverter circuit of the backlight module 400 includes a power stage circuit 41, a pair of transformers T41 and T42, a detection circuit 42, a protection circuit 43, a pair of first copper foils P41 and P44, and a pulse width modulation (PWM) controller 44.

The backlight module 400 of FIG. 3 is the same as the backlight module 300 of FIG. 2, differing only in that the detection circuit 42 includes a pair of second copper foils P42 and P43, an impedance Z4, an equivalent capacitor C41 formed between the second copper foil P42 and the first copper foil P41, and an equivalent capacitor C42 formed between the second copper foil P43 and the first copper foil P44. In the embodiment, the detection circuit 42 can detect the voltages having opposite polarities, loaded on non-adjacent light sources L31 and L32.

While embodiments of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A backlight module comprising:
   a plurality of light sources; and
   an inverter circuit disposed on a single layer circuit driving the light sources, the inverter circuit comprising:
   at least one group of transformers, comprising two primary windings and two secondary windings each comprising a high voltage terminal and a low voltage terminal, wherein a polarity of one of the high voltage terminals is opposite to a polarity of the other high voltage terminal;
   at least two first copper foils electrically connected between the light sources and the high voltage terminals of the transformer respectively;
   a power stage circuit electrically connected to the primary winding of the transformer, for converting a received a signal to an alternating current (AC) signal;
   at least one detection circuit detecting voltages output from the high voltage terminals of the transformer, the at least one detection circuit comprising:
   at least one second copper foil positioned between the first copper foils, two equivalent capacitors formed between the at least one second copper foil and the first copper foils detecting voltages output from the high voltage terminals of the transformer; and an impedance electrically connected between the at least one second copper foil and ground, dividing voltages detected by the equivalent capacitors;

a protection circuit electrically connected to a node formed between the impedance and the at least one second copper foil, for comparing the voltage divided by the impedance to a reference voltage and outputting a protection signal; and a pulse width modulation (PWM) controller electrically connected between the protection circuit and the power stage circuit, for controlling output of the power stage circuit according to the protection signal.

2. The backlight module as claimed in claim 1, wherein the low voltage terminal of the secondary winding of the transformer is electrically connected to ground via an impedance.

3. The backlight module as claimed in claim 1, wherein the low voltage terminal of the secondary winding of the transformer is electrically connected to ground.

4. The backlight module as claimed in claim 1, wherein the at least one second copper foil and any of the first copper foils are separated.

5. The backlight module as claimed in claim 4, wherein a distance between the at least one second copper foil and one of the first copper foils is equal to a distance between the at least one second copper foil and the other first copper foil.

6. The backlight module as claimed in claim 1, wherein the at least one second copper foil comprises two second copper foils.

7. The backlight module as claimed in claim 6, wherein the second copper foil and the first copper foil are separated.

* * * * *